US009789647B2

(12) United States Patent
Palmquist et al.

(10) Patent No.: US 9,789,647 B2
(45) Date of Patent: Oct. 17, 2017

(54) SEALING BAND IN A FILLING MACHINE

(71) Applicant: TETRA LAVAL HOLDINGS & FINANCE S.A., Pully (CH)

(72) Inventors: Patrik Palmquist, Lomma (SE); Ebi Shokri, Taby (SE)

(73) Assignee: TETRA LAVAL HOLDINGS & FINANCE S. A., Pully (CH)

( * ) Notice: Subject to any disclaimer, the term of this patent is extended or adjusted under 35 U.S.C. 154(b) by 0 days.

(21) Appl. No.: 15/023,326

(22) PCT Filed: Sep. 19, 2014

(86) PCT No.: PCT/EP2014/070024
§ 371 (c)(1),
(2) Date: Mar. 18, 2016

(87) PCT Pub. No.: WO2015/040173
PCT Pub. Date: Mar. 26, 2015

(65) Prior Publication Data
US 2016/0229118 A1 Aug. 11, 2016

(30) Foreign Application Priority Data
Sep. 20, 2013 (SE) ........................ 1351092

(51) Int. Cl.
B32B 37/00 (2006.01)
B29C 65/00 (2006.01)
(Continued)

(52) U.S. Cl.
CPC .......... B29C 66/849 (2013.01); B29C 65/368 (2013.01); B29C 65/3656 (2013.01);
(Continued)

(58) Field of Classification Search
CPC . B29C 65/3656; B29C 65/368; B29C 66/849; B29C 66/1122; B29C 66/43;
(Continued)

(56) References Cited

U.S. PATENT DOCUMENTS 5,247,779 A * 9/1993 Wirsig ................ B29C 66/7373
53/373.7
5,992,131 A 11/1999 Iwano et al.
(Continued)

FOREIGN PATENT DOCUMENTS

EP   0 829 426 A2   3/1998
EP   0 979 723 A2   2/2000
(Continued)

OTHER PUBLICATIONS

International Search Report (PCT/ISA/210) issued on Nov. 21, 2014, by the European Patent Office as the International Searching Authority for International Application No. PCT/EP2014/070024.
(Continued)

Primary Examiner — James Sells
(74) Attorney, Agent, or Firm — Buchanan Ingersoll & Rooney PC

(57) ABSTRACT

The present invention relates to a sealing band for a sealing jaw arrangement, comprising a contact surface and an opposite bottom surface, a first portion adjacent to the contact surface and a second portion adjacent to the bottom surface. The portions are separated by a waist, and said sealing band is symmetrical along a first axis that extends perpendicularly from a middle of the bottom surface, and the waist between the first portion and the second portion is located closer to the contact surface than to the bottom surface. The invention also relates to a counter jaw for holding the sealing band, and to a sealing jaw arrangement comprising such a counter jaw and a heating jaw.

20 Claims, 1 Drawing Sheet

(51) Int. Cl.
*B29C 65/36* (2006.01)
*B65B 51/14* (2006.01)
*B29K 705/02* (2006.01)

(52) U.S. Cl.
CPC ......... *B29C 66/1122* (2013.01); *B29C 66/43* (2013.01); *B29C 66/4312* (2013.01); *B29C 66/72321* (2013.01); *B29C 66/8122* (2013.01); *B29C 66/8167* (2013.01); *B29C 66/81264* (2013.01); *B29C 66/81427* (2013.01); *B29C 66/81457* (2013.01); *B65B 51/14* (2013.01); *B29C 66/81422* (2013.01); *B29C 66/81811* (2013.01); *B29K 2705/02* (2013.01)

(58) Field of Classification Search
CPC ......... B29C 66/4312; B29C 66/72321; B29C 66/8122; B29C 66/81264; B29C 66/81427; B29C 66/81457; B29C 66/8167; B65B 51/14

USPC .............................................. 156/581, 583.1
See application file for complete search history.

(56) References Cited

U.S. PATENT DOCUMENTS

| | | | |
|---|---|---|---|
| 6,216,420 B1* | 4/2001 | Mazzetto | B29C 65/3656 53/373.7 |
| 6,294,046 B1 | 9/2001 | Kume et al. | |
| 6,543,202 B1 | 4/2003 | Kelly | |
| 9,422,075 B2* | 8/2016 | Aul | B29C 65/3656 |
| 2002/0139084 A1 | 10/2002 | Tobolka | |
| 2005/0241277 A1 | 11/2005 | Yano et al. | |

FOREIGN PATENT DOCUMENTS

| | | |
|---|---|---|
| EP | 1 083 042 A2 | 3/2001 |
| EP | 1 205 294 A2 | 5/2002 |
| EP | 1 452 451 A1 | 9/2004 |
| JP | 10-101007 A | 4/1998 |
| WO | 97/28045 A1 | 8/1997 |
| WO | 00/44625 A1 | 8/2000 |
| WO | 2005/105579 A1 | 11/2005 |

OTHER PUBLICATIONS

Written Opinion (PCT/ISA/237) issued on Nov. 21, 2014, by the European Patent Office as the International Searching Authority for International Application No. PCT/EP2014/070024.

Swedish International Search Report issued Sep. 20, 2013, by the Sweden Patent Office, in corresponding Swedish Application No. 1351092-0 (6 pages).

* cited by examiner

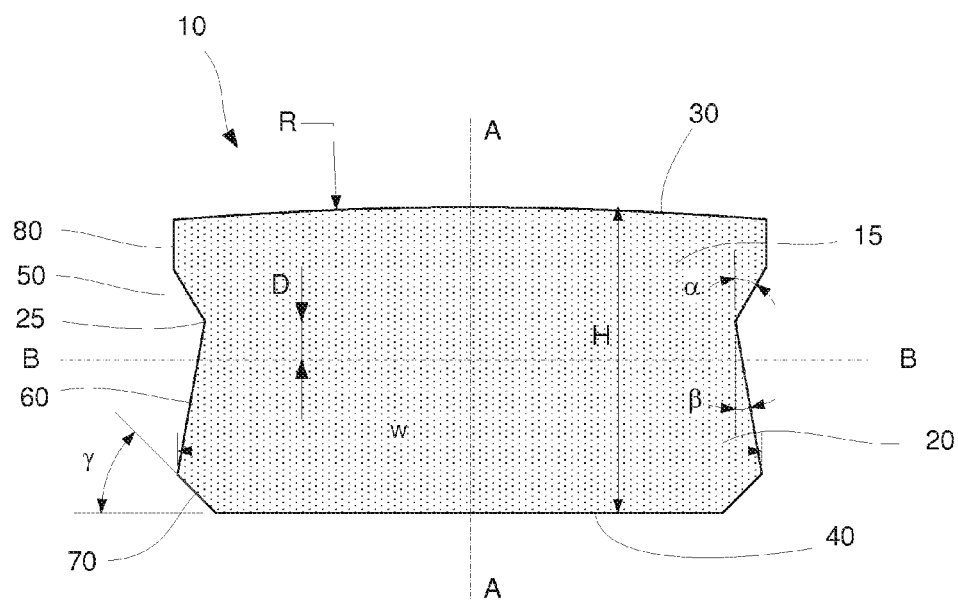
Fig. 1
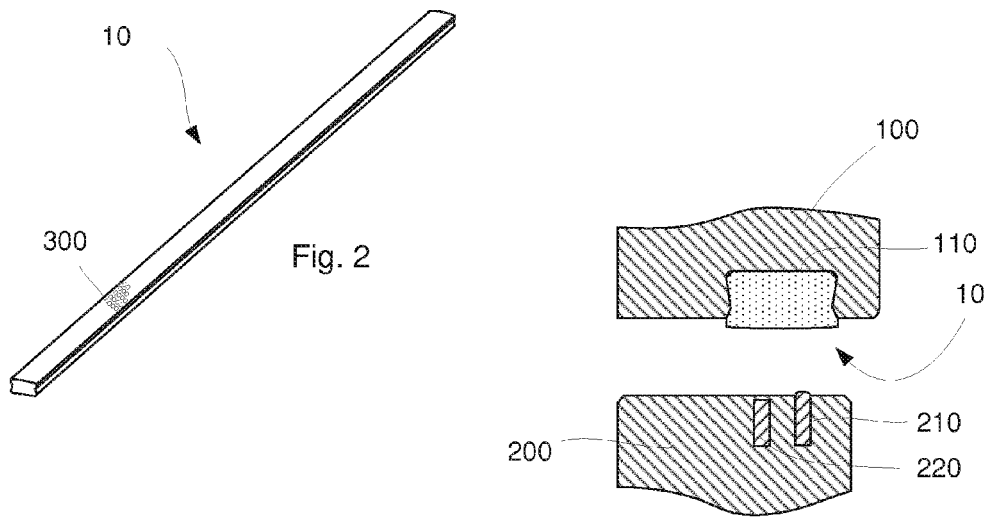
Fig. 2
Fig. 3

SEALING BAND IN A FILLING MACHINE

FIELD OF THE INVENTION

The invention relates to a sealing band for a sealing jaw arrangement, and in particular to a resilient sealing band for use in a sealing jaw arrangement in packaging machines.

BACKGROUND

Sealing bands are often used in sealing jaw arrangements in a counter jaw of a packaging machine, for providing a smooth and even counter pressure against e.g. a heating jaw. The exact shape of the sealing band, or sealing dolly, is important since it affects the quality of the sealings. If the sealings are not of good quality, liquid food packages may leak and the sterility of the packages may be jeopardised. The sealing band is a spare part that is replaced often at regular intervals. It is hence desirable that this exchange is easy yet facilitates that the sealing band is installed correctly.

SUMMARY OF THE INVENTION

In a first aspect, the invention provides a sealing band for a sealing jaw arrangement, comprising a contact surface and an opposite bottom surface, a first portion adjacent to the contact surface and a second portion adjacent to the bottom surface, said portions being separated by a waist of a narrower cross-section, said sealing band being symmetrical along a first axis that extends perpendicularly from a middle of the bottom surface, and wherein the waist between the first portion and the second portion is located closer to the contact surface than to the bottom surface. Additional aspects are given by the dependent claims.

The invention also provides a counter jaw being adapted to accommodate a sealing band according to the main claim. In a yet further aspect, the invention provides a sealing jaw arrangement comprising a counter jaw and a heating jaw, utilising the sealing band.

BRIEF DESCRIPTION OF THE DRAWINGS

The invention will be further described with reference to a specific embodiment, as shown in the drawings in which:

FIG. 1 shows a sectional view of a sealing,

FIG. 2 shows a perspective view of a sealing band of the invention, and

FIG. 3 shows a cross-sectional view of a heating jaw and a counter jaw in which the sealing band is intended to be mounted.

DETAILED DESCRIPTION OF THE INVENTION

The present invention will now be described in detail, with references to the drawings. In FIG. 1, a sealing band 10 is shown in cross section. The sealing band 10 comprises a first portion 15, being at the top in FIG. 1, and a second portion 20, being at the bottom in FIG. 1. The two portions meet at a waist 25, being formed by first angled walls 50 and second angled walls 60, one of each on either side of a centre line A-A. The waist 25 hence has a narrower cross-section, compared to the immediate surrounding sections of the first portion 15 and the second portion 20. A contact surface 30 is in use facing a heating jaw 200, see FIG. 3. The contact surface 30 has a curved shape, as seen in cross-section, with a constant radius R of approx. 50 mm. A bottom surface 40 opposite the contact surface 30 is substantially flat, and will in use be facing a counter jaw 100 in which it is mounted. Chamfers 70 are provided at the corners between the bottom surface 40 and the second angled walls 60, at an angle γ of about 45 degrees from the bottom surface 40. Top walls 80 are arranged between the first angled walls 50 and the contact surface 30, which walls 80 are parallel with a first symmetry axis A-A, which extends perpendicularly from the middle of the bottom surface 40. A second line B-B is shown midway between the top of the contact surface 30 and the bottom surface 40. The waist 25 is located a certain distance D above this line B-B, making the sealing band 10 distinctly asymmetric around line B-B. The asymmetry should be great enough to clearly show if the sealing band is mounted upside down. It has been found that the ratio between D and the overall height of the sealing band, H, should be between 0.1 and 0.15, or between 0.12 and 0.13. The waist 25 should not be to narrow, in comparison with the greatest width W of the second portion 20, and the ratio should be between 0.88 and 0.92 or between 0.89 and. 0.91.

The angle α between the first angled walls 50 and the symmetry line A-A is about 30 degrees, and the first angled walls 50 are angled out from the waist 25, in the direction of the contact surface 30. The angle β between the second angled walls 60 and the symmetry line A-A is about 10 degrees, and the second angled walls 60 are angled out from the waist, in the direction of the bottom surface 40.

The sealing band 10 is shown in a perspective view in FIG. 2, and it can be seen that the cross-section is the same throughout the band. This means that the sealing band e.g. can be manufactured through extrusion, using a nozzle having an inner contour substantially corresponding with the outer contour of the sealing band 10 as seen in FIG. 1. However, it is also possible to manufacture the sealing band through moulding or grinding. The sealing band 10 can also be provided with discrete indentations 300, e.g. dimples, on at least a part of the contact surface 30.

Typical height of the sealing band is typically around 4 mm, and the width is about 7.7 mm. The length of the sealing band varies with the dimensions of the package to seal but is typically around 270-300 mm.

In FIG. 3, a counter jaw 100 and a heating jaw 200 are shown in a rest position, in a cross-sectional view. The counter jaw 100 comprises a groove 110 which is provided with a matching shape to the sealing band 10. The groove 110 has a restriction which is intended to fit the waist 25 of the sealing band 10, such that it snaps into place securely. The heating jaw 200 comprises a first heating band 210, which protrudes outside the surface of the heating jaw 200, and a second heating band 220, which is arranged below the surface of the heating jaw 200. These heating bands 210, 220 are typically conductors that are intended to induce a current in aluminium foil that is normally present in the packaging material to be heat-sealed.

Since the sealing band 10 is symmetric around line A-A, the sealing band can be mounted in two orientations, without affecting the sealing performance. Since the sealing band however is asymmetric around line B-B, it is most difficult to mount the sealing band upside down. This ensures that the sealing band 10 is mounted in the intended orientation, and the sealing performance is not jeopardised.

During operation, the packaging material is placed between the counter jaw 100 and the heating jaw 200, and the jaws 100, 200 are pressed together. A current is driven through the heating bands 210, 220, which bands are connected in series, and a current is induced in the aluminium foil of the packaging material. This current heats the aluminium foil, which in turn heats the surrounding plastic material until it melts. The pressure from the jaws 100, 200 fuses the plastic, and the sealing is completed when the material cools down. A cooling circuit is often provided in the heating jaw, for speeding up this process.

Even though the waist 25 is described as defined by two pairs of angled walls 50, 60, the waist 25 may be a similar narrow area being defined between the first portion 15 and the second portion 20, where the adjoining walls instead are smoothly curved.

The sealing band 10 may be made of a resilient material, such as rubber or a rubber-like polymeric material, or a combination thereof. It would also be possible to use a harder material, having the same external shape, but which was provided with flexing contact surface, and lateral surfaces, e.g. by having an internal hollow space. Also foamed materials are possible, e.g. foamed polymeric or rubber-like materials. One suitable material is polyurethane, having a hardness of 93±2 Shore A and a compression set≤30%.

Whilst the invention has been described with reference to a specific embodiment, it will be appreciated that various modifications are possible within the scope of the invention. All features described in connection with any aspect of the invention can be used with any other aspect of the invention.

In this specification, unless expressly otherwise indicated, the word 'or' is used in the sense of an operator that returns a true value when either or both of the stated conditions is met, as opposed to the operator 'exclusive or' which requires that only one of the conditions is met. The word 'comprising' is used in the sense of 'including' rather than in to mean 'consisting of'. All prior teachings acknowledged above are hereby incorporated by reference. No acknowledgement of any prior published document herein should be taken to be an admission or representation that the teaching thereof was common general knowledge in Australia or elsewhere at the date hereof.

The invention claimed is:

1. A sealing band for a sealing jaw arrangement, comprising a contact surface and an opposite bottom surface, a first portion adjacent to the contact surface and a second portion adjacent to the bottom surface, said portions being separated by a waist of a locally narrower cross-section, said sealing band being symmetrical along a first axis that extends perpendicularly from a middle of the bottom surface, and wherein the waist between the first portion and the second portion is located closer to the contact surface than to the bottom surface, the waist possessing a width and the second portion of the sealing band possessing a maximum width, a relationship between the width of the waist and the maximum width of the second portion being 0.88 and 0.92 to allow a groove provided with a shape matching the sealing band to fit the waist.

2. The sealing band according to claim 1, wherein a radius of a cross-section of the contact surface is between 40 and 60 mm, said contact surface being convex.

3. The sealing band according to claim 1, wherein first angled walls and second angled walls are arranged on either side of the waist, and wherein the first angled walls are angled outwards in the direction of the contact surface.

4. The sealing band according to claim 3, wherein an angle of the first angled walls is 30 degrees in relation to the symmetry axis.

5. The sealing band according to claim 1, wherein an angle of the second angled walls is 10 degrees in relation to the symmetry axis.

6. The sealing band according to claim 1, wherein the contact surface at least partly is provided with discrete indentations, or dimples.

7. The sealing band according to claim 1, wherein the asymmetry of the sealing band, calculated as D/H, where D is the distance between the waist and a line, which line is parallel to the bottom surface and is located midway between the top of the contact surface and the bottom surface, and H is the overall height of the sealing band, measured from the top of the contact surface to the bottom surface, is between 0.10 and 0.15, or is between 0.12 and 0.13.

8. The sealing band according to claim 1, wherein the relationship between the width of the waist and the maximum width of the second portion is between 0.89 and 0.91.

9. Sealing band according to claim 1, wherein the band is made of rubber or a rubber-like polymeric material, or a foamed polymer, or a more rigid polymeric material having flexing contact wall, or polyurethane.

10. Counter jaw being provided with a groove that is configured for a sealing band according to claim 1.

11. Sealing jaw arrangement, comprising a counter jaw according to claim 10, and a heating jaw.

12. A sealing band in combination with a counter jaw that is positionable in opposition to a heating jaw to seal packaging material positioned between the heating jaw and the counter jaw during a sealing operation, the counter jaw comprising a groove in which is positioned the sealing band, the sealing band comprising a bottom surface and an opposite contact surface that contacts the packaging material during the sealing operation, the sealing band also comprising a first portion and a second portion, the bottom surface being an end surface of the second portion and the contact surface being an end surface of the first portion, the bottom surface and the entire second portion being located in the groove of the counter jaw, the contact surface and a part of the first portion being located outside the groove, the first and second portions being separated by a waist possessing a locally narrower cross-section, the waist being formed by first and second angled walls, the first angled wall extending from the waist toward the contact surface, the second angled wall extending from the waist toward the bottom surface, the entire second angled wall and a part of the first angled wall being located in the groove, the sealing band being symmetrical along a first axis that extends perpendicularly from a middle of the bottom surface, the waist between the first portion and the second portion being located closer to the contact surface than to the bottom surface, the waist possessing a width and the second portion of the sealing band possessing a maximum width, and a relationship of the width of the waist and the maximum width of the second portion being between 0.88 and 0.92.

13. The sealing band in combination with the counter jaw according to claim 12, wherein the contact surface is convex and possesses a radius between 40 and 60 mm.

14. The sealing band in combination with the counter jaw according to claim 12, wherein an angle of the first angled walls is 30 degrees in relation to the symmetry axis.

15. The sealing band in combination with the counter jaw according to claim 12, wherein an angle of the second angled walls is 10 degrees in relation to the symmetry axis.

16. The sealing band in combination with the counter jaw according to claim 12, wherein the contact surface at least partly is provided with discrete indentations, or dimples.

17. The sealing band in combination with the counter jaw according to claim 12, wherein D/H is between 0.10 and 0.15, where D is the distance between the waist and a line, which line is parallel to the bottom surface and is located midway between the top of the contact surface and the bottom surface, and H is the overall height of the sealing band, measured from the top of the contact surface to the bottom surface.

18. The sealing band in combination with the counter jaw according to claim 12, wherein D/H is between 0.12 and 0.13, where D is the distance between the waist and a line, which line is parallel to the bottom surface and is located midway between the top of the contact surface and the bottom surface, and H is the overall height of the sealing band, measured from the top of the contact surface to the bottom surface.

19. The sealing band in combination with the counter jaw according to claim 12, wherein the a relationship of the width of the waist and the maximum width of the second portion being between 0.89 and 0.91.

20. The sealing band in combination with the counter jaw according to claim 12, wherein the sealing band is made of one of: i) rubber; ii) a rubber-like polymeric material; iii) a foamed polymer; iv) a more rigid polymeric material having a flexing contact wall; or v) polyurethane.

* * * * *